J. J. CARTWRIGHT.
COOKING RANGE AND STOVE.
APPLICATION FILED JAN. 27, 1912.

1,069,918.

Patented Aug. 12, 1913.
5 SHEETS—SHEET 1.

WITNESSES

INVENTOR
J. J. CARTWRIGHT
BY
ATTORNEY

J. J. CARTWRIGHT.
COOKING RANGE AND STOVE.
APPLICATION FILED JAN. 27, 1912.

1,069,918.

Patented Aug. 12, 1913.
5 SHEETS—SHEET 4.

WITNESSES

INVENTOR
J. J. CARTWRIGHT
BY
ATTORNEY

J. J. CARTWRIGHT.
COOKING RANGE AND STOVE.
APPLICATION FILED JAN. 27, 1912.
1,069,918.
Patented Aug. 12, 1913.
5 SHEETS—SHEET 5.
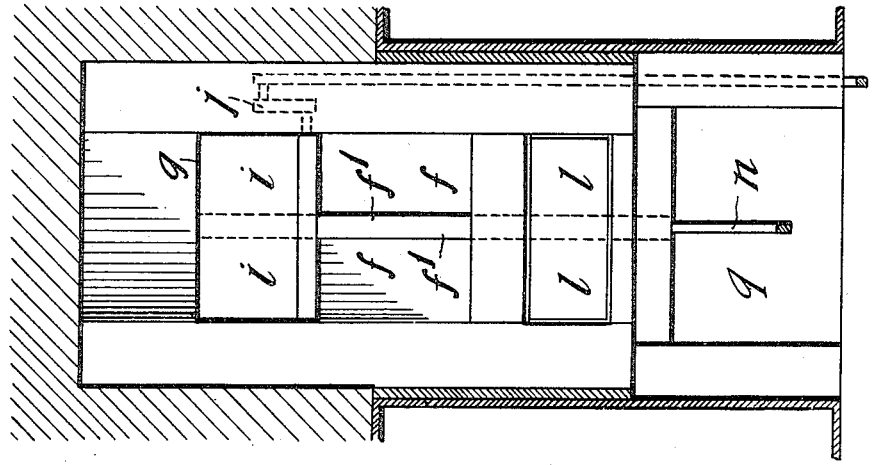
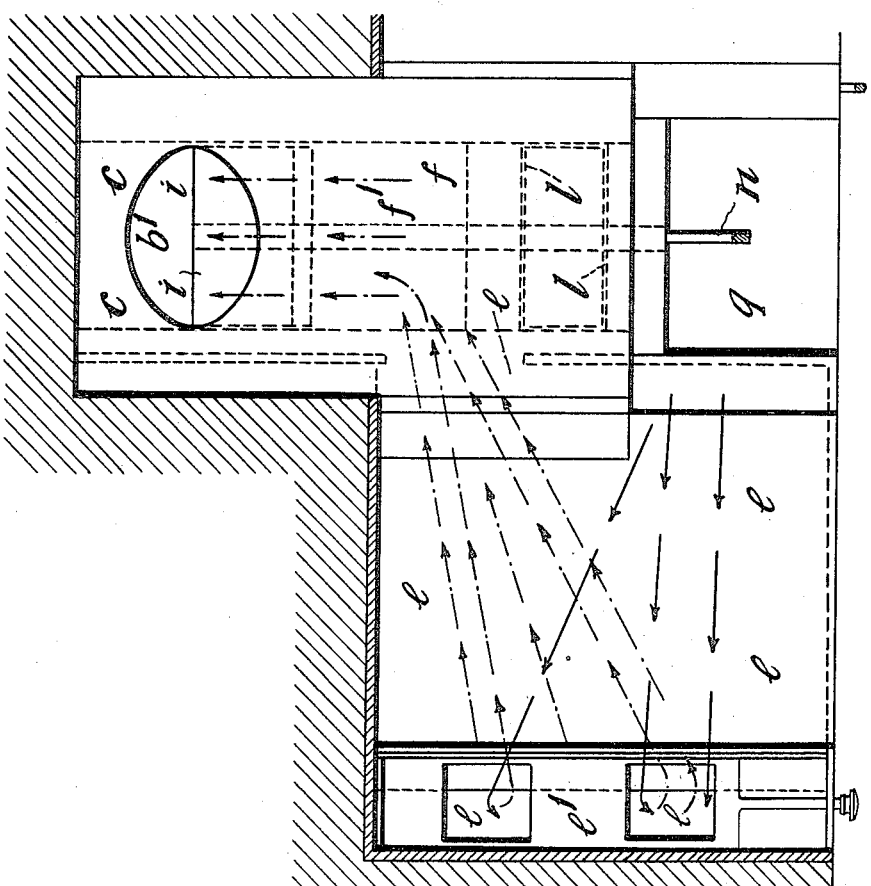
WITNESSES
INVENTOR
J. J. CARTWRIGHT
BY
ATTORNEY

UNITED STATES PATENT OFFICE.

JOSEPH JOHN CARTWRIGHT, OF SHREWSBURY, ENGLAND, ASSIGNOR TO PHILIP CHARLES KNIGHTLEY WOLFE MURRAY, OF LONDON, ENGLAND.

COOKING RANGE AND STOVE.

1,069,918. Specification of Letters Patent. Patented Aug. 12, 1913.

Application filed January 27, 1912. Serial No. 673,718.

*To all whom it may concern:*

Be it known that I, JOSEPH JOHN CARTWRIGHT, a citizen of Great Britain, residing at Abbey Foregate, Shrewsbury, county of Salop, England, have invented certain new and useful Improvements in Cooking Ranges and Stoves, of which the following is a specification.

This invention comprises improvements in and relating to cooking ranges and stoves and refers to such ranges and stoves as are provided with boilers for providing a supply of hot water.

The object of my invention is to provide means for utilizing the waste heat from the oven gases for heating the boiler. The hot gases from the fire after passing around the oven flues, while cooking is in progress, instead of being wasted impart considerable heat to the boiler and assist in providing a plentiful supply of hot water with a minimum expenditure of fuel. I continue the flues beneath the oven or ovens and lead them into a flue (or flues) which passes up at the back of the grate to beneath the boiler where it may enter the ordinary boiler flue which passes direct from the bottom of the grate beneath the boiler to an uptake at the back, as has before been done. In accordance with my invention within this flue (or flues) I provide means for regulating the amount of boiler surface that is exposed to the gases and also means for deflecting the gases entirely from the boiler surface when desired.

In order that my invention may be more easily understood and more readily carried into practical effect, I have appended hereunto five sheets of drawings, on which—

Figure 1:
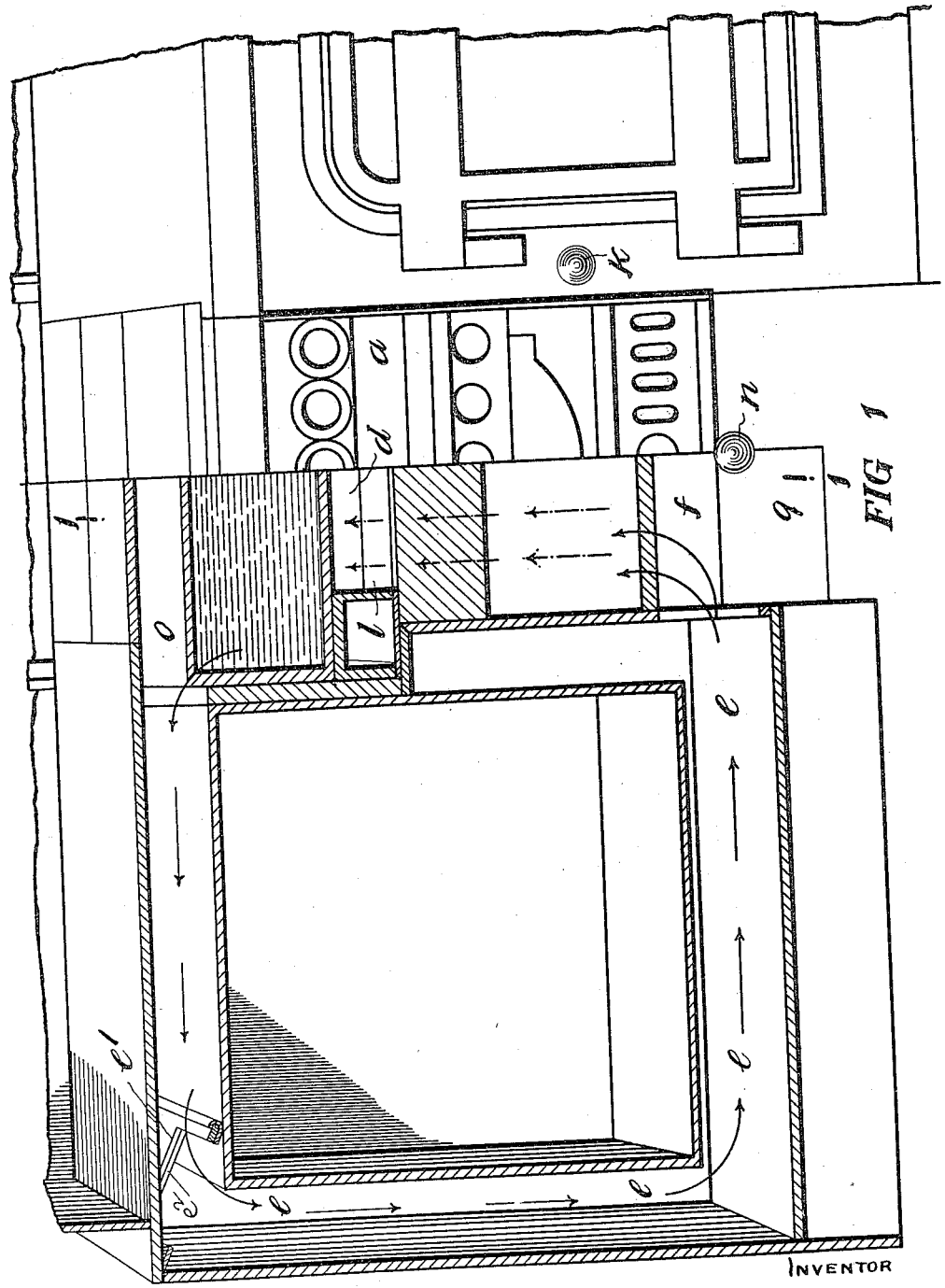
Figure 2:
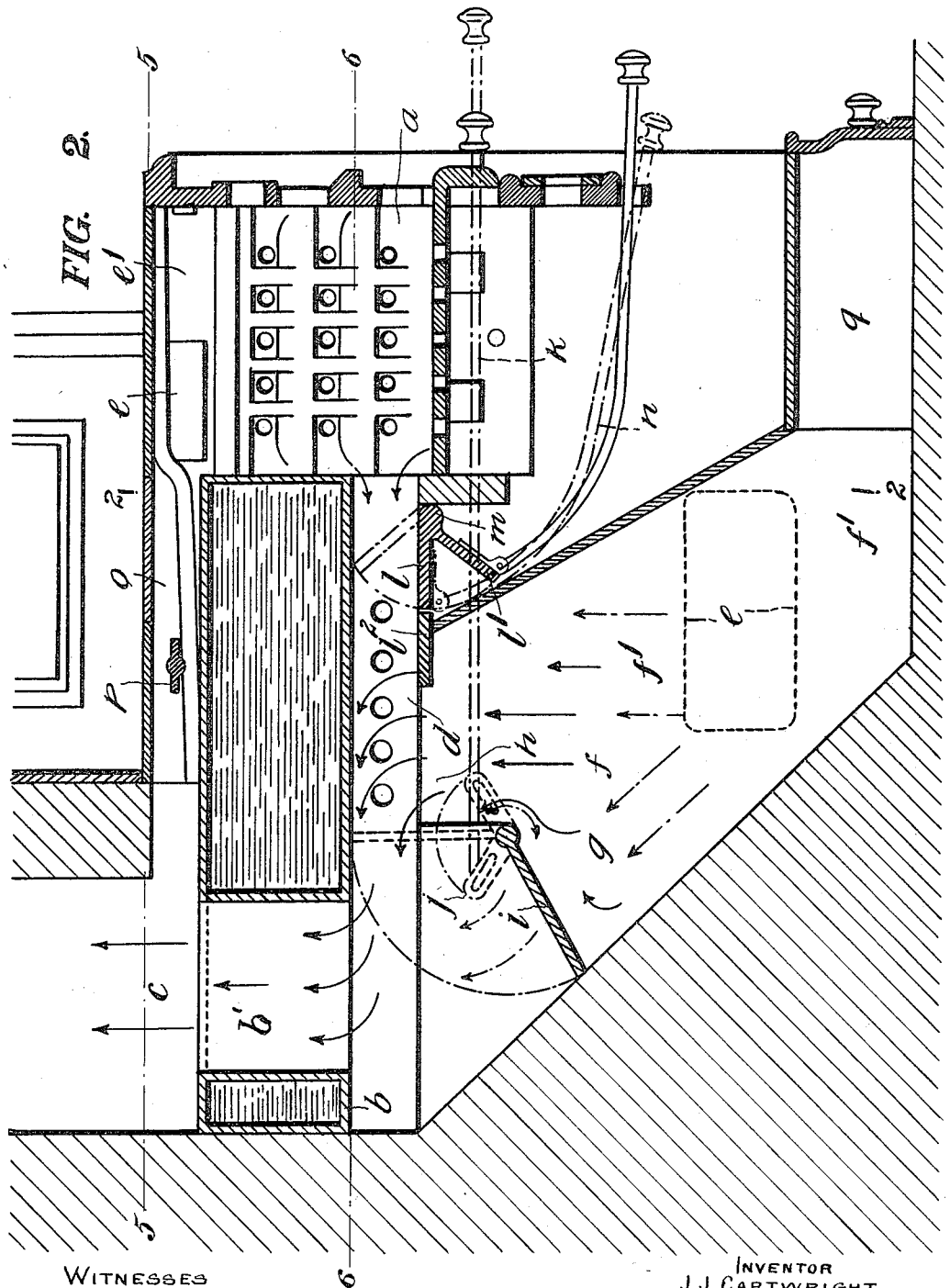
Figure 3:
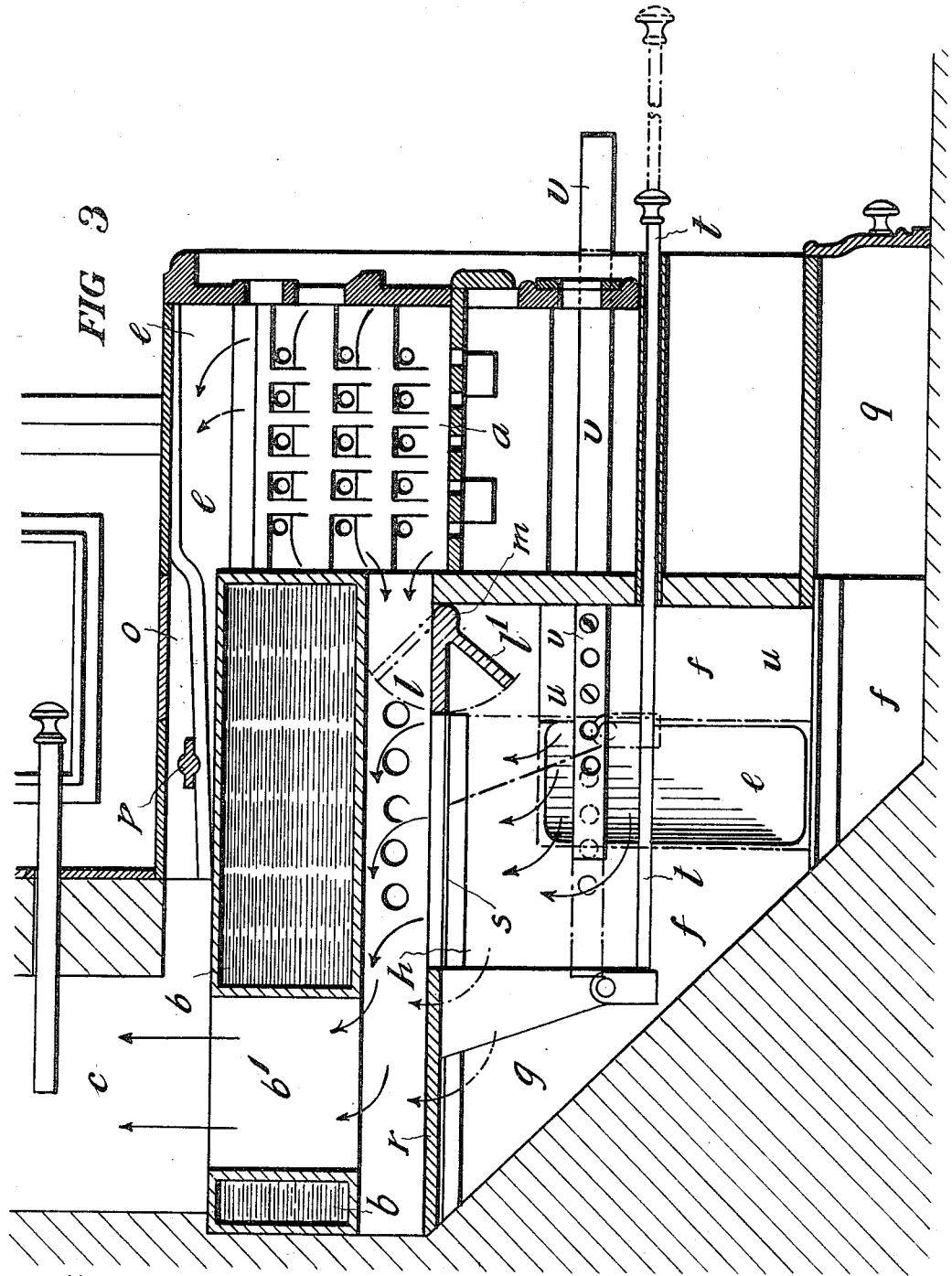
Figure 4:
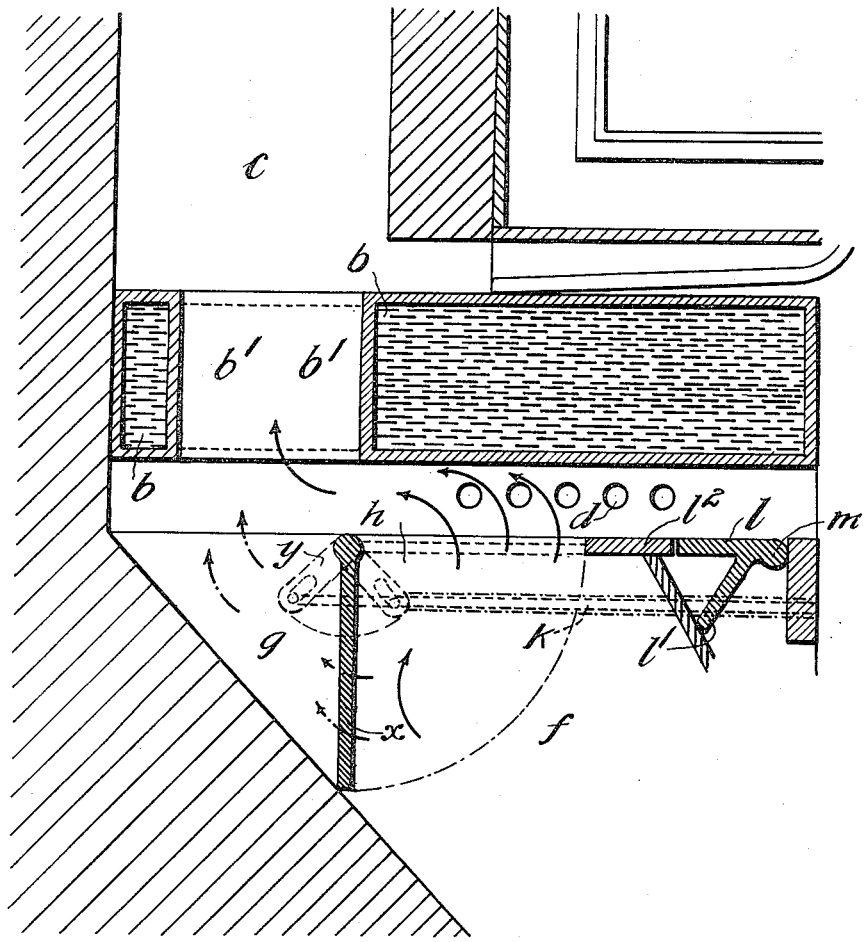

Figure 1 shows on the right hand an elevation and on the left a section on line 2—2 of Fig. 2 of a cooking range constructed in accordance with my invention. Fig. 2 is a section on line 1—1 of Fig. 1. Fig. 3 is a section similar to Fig. 2 showing a modified form of carrying out my invention. Fig. 4 is a part of a similar sectional view to Fig. 2 showing a further modified form of damper arrangement. Fig. 5 is a part sectional plan taken on line 5—5 of Fig. 2. Fig. 6 is a part sectional plan on line 6—6 of Fig. 2 showing the pivoted dampers.

In the example of the invention shown at Figs. 1 and 2 $a$ is the grate, $b$ the boiler, $c$ the usual chimney flue, $d$ the ordinary boiler flue and $e$ the flues above the grate leading around the ovens. Instead of turning off the flues $e$ below the ovens and leading them to the back and into the chimney I continue them beneath the ovens into the central space of the range. At the central space I lead them into a chamber or flue $f$ which may be brought into communication with the chimney flue $c$ directly by means of the path $g$ or with the boiler flue $d$ through the passage $h$. A dividing wall or baffle $f^1$ may be arranged if desired in the chamber or flue $f$ so that the hot gases issuing from the flues under the oven on one side will not strike across to the other side. A pivotal damper $i$ is arranged to control the outlet of the gases from the chambers $f$ as will be clearly seen from Fig. 2, where it is in position for closing the direct path $g$ to the chimney flue and deflecting the hot gases up so that they enter the boiler flue $d$ and impinge against the underside of the boiler and impart considerable heat to the boiler before passing to the chimney $c$. The boiler may be formed with a substantial passage through it as at $b^1$ through which the hot gases pass without obstruction and contact with further surfaces of the boiler giving a larger heating area, or the gases may be taken up at the back of the boiler in the usual way. The damper $i$ extends across the chamber $f$ beneath the boiler, and is shown as adapted for being operated by means of a slotted crank $j$ pulled over or returned by a sliding rod $k$ operable from the front of the range but I am not limited to any particular method of operating the dampers either in this example or any of those following. The boiler flue $d$ is controlled in this example by a separate damper $l$ pivoted at $m$ and adapted to be raised on its pivot to obturate the passage from the grate by means of a curved sliding rod $n$, the connection of which is clearly seen at Fig. 2. The damper $l$ is formed with double plates or leaves and the lower plate $l^1$ prevents cold air passing beneath the grate into the boiler flue when the upper plate is raised for the purpose stated. The usual passage from above the grate to the chimney is shown at $o$, and $p$ is a damper adapted to be turned to close same when the hot gases are required to pass around the oven flues $e$ or below the boiler. The oven flues $e$ in the example are controlled by means of the slide damper $e^1$ of usual form. This damper comprises a plate with holes formed in it and it slides above a fixed plate which has similar holes therein. The holes in plate $e^1$ are not in corresponding positions in the length of the plate to those in plate $e^2$ so that when plate $e^1$ is pulled forwardly from the position shown in Fig. 5 the holes in plate $e^2$ are closed by solid parts of plate $e^1$. This is a well known construction of damper.

It will be seen from the illustrated arrangement of the chamber $f$ that it is continued to the floor level and has a connection with the space $q$ so that any dust, etc., that cannot be raked to the front from the boiler flue may be pushed back and falls to the floor level at the back of the space $q$ and may be removed through that passage.

In the further example shown at Fig. 3 the same letters of reference are used where the parts are the same and no further description of those parts is necessary. In this arrangement instead of employing the pivotal damper $i$ the outlets $g$, $h$, from the chamber $f$ are controlled by the damper or plate $r$ arranged for sliding on a suitable track $s$ and operated by a rod $t$. The openings into the chamber $f$ of the oven flues $e$ may be directly controlled by a damper $u$ sliding on suitable tracks and operated by the rod $v$. This then controls the oven flues and replaces the ordinary damper $e^1$ of Fig. 1.

In the construction shown at Fig. 4, the damper $x$ is arranged so that it may be swung up into horizontal position by operating the slotted lever $y$ by a rod $k$ so that in conjunction with a fixed floor member $l^2$ and the two-leaf damper $l$ before described, it provides a complete floor for the boiler flue. Similarly in Fig. 3 the means $r$ for controlling the heating of the boiler flue may, in conjunction with $l$, form a complete floor for the boiler flue from the grate when the passage at the grate is open.

In operation, when the heat of the fire is intended to heat the oven or ovens and boiler the oven flue dampers $e^1$ (or dampers $u$ Fig. 3) are operated so as to open the flues $e$. The pivotal damper $l$ is turned up to close the flue from the fire grate under the boiler and the pivoted damper $i$ is turned to open the passage $h$. The hot gases from the fire then pass right around the oven or ovens heating them in the usual way and thence into the chamber $f$ passing upward by the path $h$ to the underside of the boiler and on by way of the flue $b^1$ to the chimney $c$.

It will be seen that the heating of the boiler may be controlled by the position of the dampers $i$ (or the damper or plate $r$, Fig. 3), the dampers being set to occupy the position shown in full lines at Figs. 2, 3, and 4, to permit considerable heating to take place; or in the position shown in dotted lines to reduce the boiler surface exposed or entirely protect it, without interfering with the heating of the ovens, and to permit the direct passage of the hot gases. In this case the hot gases follow the path $g$ to the chimney $c$.

Wherever the term cooking range is used in the claims or specification it is intended to include, where suitable, stoves and other similar cooking apparatus.

What I claim and desire to secure by Letters Patent then is:—

1. Cooking range comprising a heating means, an oven heated thereby and situated at the side of said heating means, a boiler arranged behind said heating means, passages for the hot gases from said heating means around said oven, said passages leading into a chamber in which a surface of the boiler is exposed, with control means within such chamber so as to permit the gases to impinge upon the under surface of the boiler or to pass direct to the outlet, a passage direct from said heating means to said boiler and means for controlling said direct passage.

2. Cooking range comprising a heating means, an oven heated thereby and situated at the side of said heating means, a boiler arranged behind said heating means, passages for the hot gases from said heating means around said oven, said passages leading into a chamber in which a surface of the boiler is exposed, with control means within such chamber so as to permit the gases to impinge upon the under surface of the boiler or to pass direct to the outlet, said control means comprising a pivoted damper disposed across said chamber, with means for operating said damper, a passage direct from said heating means to said boiler and means for controlling said direct passage.

3. Cooking range comprising a heating means, an oven heated thereby and situated at the side of said heating means, a boiler arranged behind said heating means and formed with a substantial passage therethrough to lead the gases to the chimney, passages for the hot gases around said oven, said passages leading into a chamber in which a surface of the boiler is exposed with control means within such chamber so as to permit the gases to impinge upon the under surface of the boiler or to pass direct to the outlet, a passage direct from said heating means to said boiler and means for controlling said direct passage.

4. Cooking range comprising a heating means, an oven heated thereby and a boiler, passage for the hot gases from said heating means around said oven, said passage leading into a chamber in which a surface of the boiler is exposed, means within said chamber for controlling the heating of the boiler, said means comprising a pivoted plate disposed across said space, a passage direct from the said heating means to said boiler and means for controlling said direct passage.

5. Cooking range comprising a heating means, an oven heated thereby and a boiler, passage for the hot gases from said heating means around said oven, said passage leading into a chamber in which a surface of the boiler is exposed, means within said chamber for controlling the heating of the boiler, said means comprising a pivotal plate disposed across said space, a passage direct from the said heating means to said boiler and means for controlling said direct passage, said means comprising a two leaf hinged damper, substantially as described.

In testimony whereof, I, the said JOSEPH JOHN CARTWRIGHT have signed my name to this specification in the presence of two subscribing witnesses, this 17th day of January 1912.

JOSEPH JOHN CARTWRIGHT.

Witnesses:
F. E. BRETTELL,
E. SIMS BRETTELL.

---

Copies of this patent may be obtained for five cents each, by addressing the "Commissioner of Patents, Washington, D. C."